Feb. 22, 1927.
R. LA FRANCE
1,618,290
DELIVERING CHARGES OF MOLTEN GLASS
Filed Aug. 11, 1920
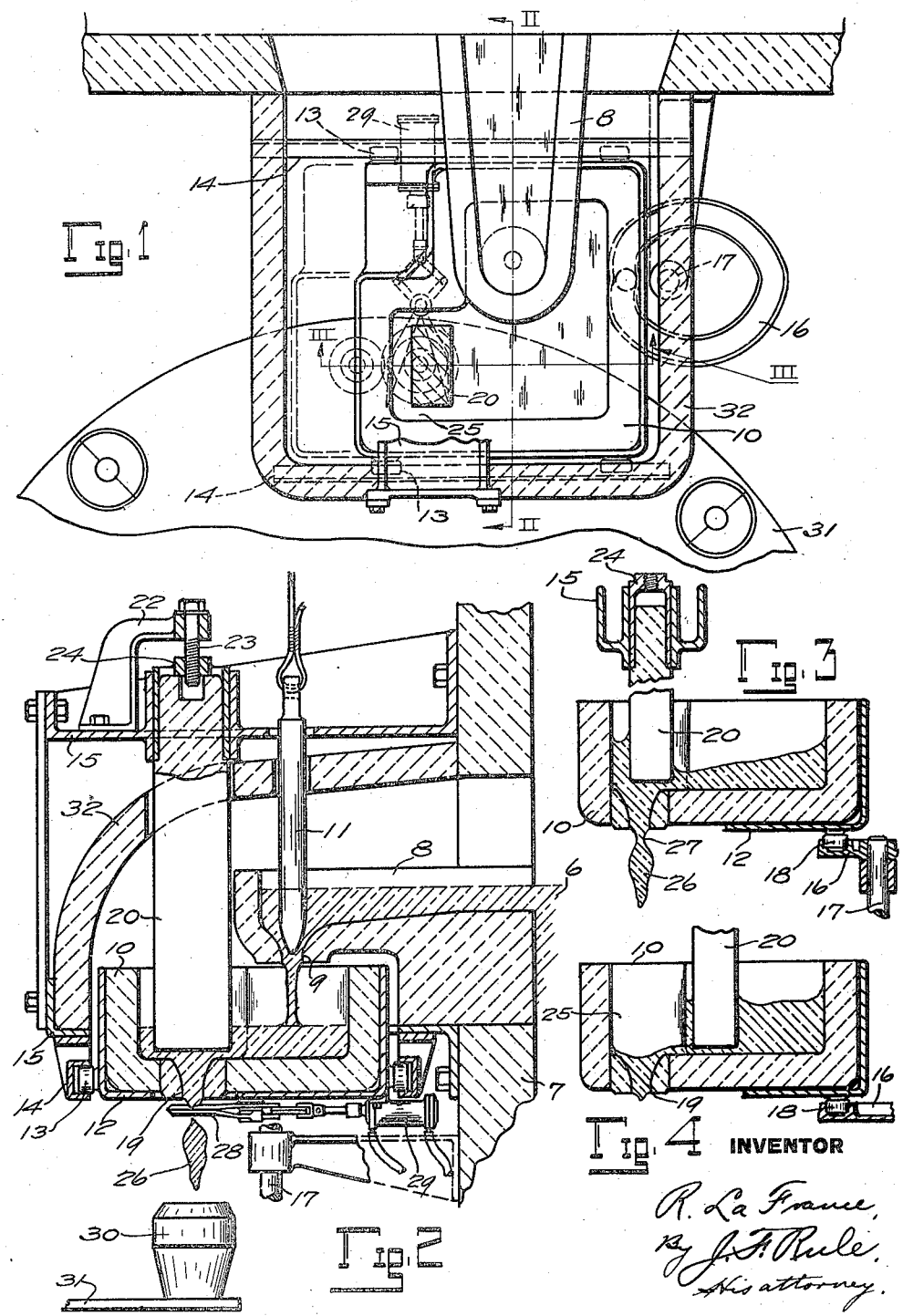
INVENTOR
R. La France,
By J. H. Rule,
His attorney.

Patented Feb. 22, 1927.

1,618,290

UNITED STATES PATENT OFFICE.

RICHARD LA FRANCE, OF TOLEDO, OHIO, ASSIGNOR TO THE OWENS BOTTLE COMPANY, OF TOLEDO, OHIO, A CORPORATION OF OHIO.

DELIVERING CHARGES OF MOLTEN GLASS.

Application filed August 11, 1920. Serial No. 402,815.

My invention relates to apparatus for producing individual mold charges or gobs of glass from a supply of molten glass. In its preferred form, the invention comprises a receptacle or charger outside of the melting tank or furnace, into which receptacle the glass flows in a continuous stream. The receptacle is provided with an outlet opening in the bottom thereof through which the glass is periodically discharged in formed masses or gobs. In order to control the discharge, I provide means for periodically varying the head of glass over the outlet opening by causing the glass to ebb and flow from and toward said outlet. Such movement of the glass may be controlled by a paddle or other regulating device projecting into the glass in said receptacle, said device and receptacle having a relative lateral movement. In this manner the flow of glass through the outlet is alternately augmented and retarded and thereby discharged in the form of masses or gobs which are severed by a cutter beneath the outlet and permitted to drop into the molds. In its preferred form, the receptacle is reciprocated horizontally while the regulating device remains stationary. This movement of the receptacle may be utilized in feeding the charges to the molds on a continuously rotating mold carriage, the receptacle being timed to advance with each mold while the gob is being discharged and then return to register with the next succeeding mold.

Other features and advantages will appear hereinafter.

The present application discloses certain features of novelty also shown in my co-pending applications, Serial Numbers 402,814 and 402,816, filed August 11, 1920.

In the accompanying drawings:

Figure 1 is a sectional plan of apparatus embodying the principles of my invention.

Figure 2 is a sectional side elevation of the same at the line II—II on Figure 1.

Figure 3 is a section at the line III—III on Figure 1, showing the relation of parts just before the gob has been severed.

Figure 4 is a similar view showing a different relative position of the parts.

The molten glass 6 is supplied from a melting tank 7 and may flow in a continuous stream through a spout 8 in the side wall of the furnace. Said spout is provided at its outer end with a discharge opening 9 in the bottom thereof through which the glass discharges into a receptacle 10. The rate of flow through the opening 9 is controlled by a fire clay plug 11 which may be adjusted up and down to regulate the flow and which also may be lowered to entirely stop the flow when the apparatus is not in use. The receptacle 10 may be made of fire clay supported in a metal frame 12 on which are mounted rolls 13 to run in horizontal ways or tracks 14. The tracks 14 are carried on a framework 15 which forms a support for the entire apparatus. The receptacle 10 is reciprocated horizontally by means of a cam 16 secured to a continuously rotating vertical drive shaft 17. A cam roll 18 attached to the frame 12 forms a connection between the receptacle and cam.

The glass is discharged from the receptacle 10 through an outlet opening 19 in the bottom thereof. The flow of glass through this opening is regulated and controlled by a regulator 20 in the form of a vertical clay bar or block projecting downward into the glass in the receptacle. Said regulator is supported from a bracket 22 mounted on the frame 15, and has an adjustable connection with said bracket by means of a screw bolt 23 threaded in a metal supporting cap 24 on the regulator 20. The receptacle 10, as shown in Figure 1, has an offset portion 25, beneath which is the discharge orifice 19.

The operation is as follows: As the cam 16 rotates, it moves the receptacle 10 from the position shown in Figure 3 and in full lines on Figure 1, to that shown in Figure 4 and in broken lines in Figure 1. This relative movement of the receptacle and the regulator 20 causes the glass above the discharge orifice to recede. During this movement, the regulator, owing to the glass adhering thereto, exerts a pulling or retarding action on the glass in the outlet orifice which temporarily retards or stops the flow. As the receptacle moves to the right, its movement relative to the regulator causes the glass to be piled up in front of the regulator over the discharge orifice, thereby increasing the head of glass and increasing the expelling action of gravity, so that the glass is discharged in a mass or gob 26. The offset portion 25 of the receptacle being comparatively narrow, augments the wave action or piling up of the glass above the discharge orifice. It will thus be seen that the glass is advanced in surges or waves, there being an ebb and flow of the glass from and towards the orifice. The retarding action or backward pull of the regulator as the glass recedes, acts by its upward pull on the glass to restrict the diameter of the issuing glass and form a neck 27.

The gob is severed at said neck by a pair of shears 28 connected to an air actuated piston motor 29 operated in synchronism with the movements of the receptacle 10, said cutter being mounted on the receptacle to reciprocate therewith. The gobs 26 drop directly into molds 30 on a mold carriage 31 which may be rotated continuously. The drive shaft 17 may be connected in any suitable manner to be driven in synchronism with the rotation of the mold carriage, the parts being so timed that a gob is discharged into each mold while the latter is beneath the discharge outlet. The receptacle 10 is preferably timed to move horizontally with the mold and at substantially the same speed while the mold is beneath the discharge orifice, the reciprocating movement of the receptacle being thus utilized to assist in transferring the glass to the moving molds. The gob forming apparatus, however, is also adapted for feeding the glass to molds while the latter are stationary. Although, as herein shown, the regulator 20 is stationary and the receptacle 10 reciprocates, it will be understood that a similar result can be obtained by reversing this operation, that is, by reciprocating the regulator horizontally in the stationary receptacle. That is to say, it is the relative movement of the receptacle and regulator which causes the surging or flowing of the glass toward and from the discharge orifice. A boot or cover 32 of refractory material surrounds and protects the glass in the receptacle 10 and trough 8. Burners may be provided within the cover 32, if desired to increase the temperature of the glass.

Modifications may be resorted to within the spirit and scope of my invention.

What I claim is:

1. The combination of a receptacle to contain molten glass, said receptacle provided with an outlet orifice in the bottom thereof, a regulator extending into the glass in the receptacle, and automatic means to cause a relative horizontal reciprocating movement of the receptacle and regulator.

2. The combination of a receptacle to contain molten glass, said receptacle having a discharge opening in the bottom thereof, a block of refractory material projecting into the glass in said receptacle, and means to cause a relative horizontal reciprocating movement of said block and said orifice toward and from each other and thereby cause a periodically variable discharge of glass through said orifice.

3. The combination of a receptacle to contain molten glass, said receptacle having a discharge opening in the bottom thereof, a block of refractory material projecting into the glass in said receptacle, means to cause a relative horizontal reciprocating movement of said block and said orifice toward and from each other and thereby cause a periodically variable discharge of glass through said orifice, and means to continuously supply molten glass to said receptacle.

4. The combination of a receptacle for molten glass, having an outlet opening in the bottom thereof, a regulator extending into the glass in the receptacle, and means to cause a relative horizontal reciprocating movement of the regulator and receptacle by which the regulator is periodically brought alternately from a position directly over said opening to a position at one side thereof.

5. The combination of a receptacle to contain molten glass, said receptacle having a discharge opening in the bottom thereof, means to supply molten glass in a continuous stream to said receptacle and maintain a head of glass in the receptacle, a stationary regulator projecting into the glass in said receptacle, and means to reciprocate the receptacle horizontally.

6. The combination of a receptacle to contain molten glass, said receptacle having an outlet opening in the bottom thereof, a regulator projecting into the glass in the receptacle, and means to cause a relative horizontal reciprocating movement of the receptacle and regulator by which the regulator is moved toward and from said outlet, said receptacle and regulator being so shaped that the glass is piled up over the outlet in advance of the regulator, whereby the flow of glass through the outlet is accelerated, said regulator being operable as it recedes to exert an upward pull or retarding action on the glass in said orifice.

7. The combination of a transversely reciprocating receptacle to contain the molten glass, having an outlet opening in the bottom thereof, and means opposing movement of the glass with said receptacle and operable thereby to regulate the discharge of glass through said outlet.

8. The combination of a rotating mold carriage, molds thereon, a receptacle to contain molten glass, said receptacle having a discharge opening in the bottom thereof, means to reciprocate said receptacle horizontally in synchronism with the movements of the molds and thereby cause the discharge opening to advance with a mold and then return and advance with a succeeding mold, and a stationary regulator projecting into the glass in said receptacle and operable to cause an ebb and flow of the glass from and toward said opening as the receptacle reciprocates.

9. The combination of a receptacle, a regulator, means to flow a constant stream of glass therein, said receptacle having an outlet orifice, and automatic means to cause an ebb and flow of glass in said receptacle from and toward said orifice to control the discharge therethrough, comprising roller paths for receptacle rolls to traverse, and cam means for causing relative movement of said regulator and receptacle.

Signed at Toledo, in the county of Lucas and State of Ohio, this 9th day of August, 1920.

RICHARD LA FRANCE.